(12) United States Patent
Mizukami et al.

(10) Patent No.: US 11,292,183 B2
(45) Date of Patent: Apr. 5, 2022

(54) MANUFACTURING METHOD AND FORMING APPARATUS OF THREE-DIMENSIONAL FORMED OBJECT

(71) Applicant: Seiko Epson Corporation, Tokyo (JP)

(72) Inventors: Shunsuke Mizukami, Hokuto (JP); Kazuhide Nakamura, Asahi (JP); Koichi Saito, Matsumoto (JP); Kohei Yuwaki, Shiojiri (JP)

(73) Assignee: Seiko Epson Corporation

( * ) Notice: Subject to any disclaimer, the term of this patent is extended or adjusted under 35 U.S.C. 154(b) by 530 days.

(21) Appl. No.: 16/280,103

(22) Filed: Feb. 20, 2019

(65) Prior Publication Data

US 2019/0255762 A1 Aug. 22, 2019

(30) Foreign Application Priority Data

Feb. 21, 2018 (JP) .............................. JP2018-028827

(51) Int. Cl.
*B29C 64/106* (2017.01)
*B29C 64/209* (2017.01)
*B33Y 30/00* (2015.01)
*B33Y 50/02* (2015.01)
*B33Y 10/00* (2015.01)

(52) U.S. Cl.
CPC .......... *B29C 64/106* (2017.08); *B29C 64/209* (2017.08); *B33Y 10/00* (2014.12); *B33Y 30/00* (2014.12); *B33Y 50/02* (2014.12)

(58) Field of Classification Search
CPC .............................. B29C 64/106; B33Y 10/00
See application file for complete search history.

(56) References Cited

U.S. PATENT DOCUMENTS

| | | | |
|---|---|---|---|
| 2004/0005374 A1* | 1/2004 | Narang | B22F 10/10 425/375 |
| 2011/0054663 A1 | 3/2011 | Matsui et al. | |
| 2015/0174824 A1* | 6/2015 | Gifford | B29C 64/182 425/183 |
| 2016/0361869 A1* | 12/2016 | Mark | B29C 70/20 |
| 2017/0095974 A1 | 4/2017 | Ferrara, Jr. et al. | |
| 2017/0210069 A1* | 7/2017 | Stubenruss | B29C 64/118 |

FOREIGN PATENT DOCUMENTS

| | | |
|---|---|---|
| CN | 106573405 A | 4/2017 |
| JP | 2008-279418 A | 11/2008 |
| JP | 2011-051243 A | 3/2011 |
| JP | 2017-065256 A | 4/2017 |

\* cited by examiner

*Primary Examiner* — Nathan T Leong
(74) *Attorney, Agent, or Firm* — Harness, Dickey & Pierce, P.L.C.

(57) ABSTRACT

In a manufacturing method of a three-dimensional formed object, the method includes a first discharging in which a forming material is continuously discharged from a nozzle while causing a position of the nozzle to change with respect to the forming table in a first direction which is perpendicular to a top surface of the forming table to cause the forming material to be deposited in the first direction, a second discharging in which the forming material is continuously discharged from the nozzle while changing the position of the nozzle with respect to the forming table in a second direction which is parallel to the top surface of the forming table to dispose the forming material along the second direction, and repeating in which the first discharging and the second discharging are repeated.

7 Claims, 8 Drawing Sheets

MANUFACTURING METHOD AND FORMING APPARATUS OF THREE-DIMENSIONAL FORMED OBJECT

This application claims priority under 35 U.S.C. § 119 to Japanese Patent Application No. 2018-028827 filed on Feb. 21, 2018, the entire disclosure of which is expressly incorporated by reference herein.

BACKGROUND

1. Technical Field

The present invention relates to a manufacturing method of a three-dimensional formed object.

2. Related Art

Various methods are proposed in which a fluid material is disposed at a desired position to form a three-dimensional formed object. For example, in the technique of JP-A-2011-51243, droplets of an ink drip from an ink jet head one at a time in order, by causing the droplets of ink to solidify in order from the droplet of ink which is previously dripped through the evaporation of a solvent or a dispersion medium among the ink components, a material is deposited to form a three-dimensional formed object.

In the technique of JP-A-2011-51243, there is a problem in that the adhesive force between a part which is formed by the ink that is previously dripped and a part which is formed by the ink that is subsequently dripped is weakened and the strength of the three-dimensional formed object is reduced in a direction in which the material is deposited. This problem is not limited to the three-dimensional formed object which is formed using an ink jet forming method such as the one in JP-A-2011-51243. For example, in a three-dimensional formed object which is formed by stacking layers in a predetermined stacking direction, there is a problem in that the overall strength of the three-dimensional formed object in the stacking direction is reduced by the stacked layers being apt to separate from each other. In the technique of forming a three-dimensional formed object, it is desirable to suppress a reduction in the strength of the formed object which originates in the direction in which the forming material which is used in the forming is stacked.

SUMMARY

According to an aspect of the invention, there is provided a manufacturing method of a three-dimensional formed object. The manufacturing method includes a first discharging in which a forming material is continuously discharged from a nozzle while causing a position of the nozzle to change with respect to a forming table in a first direction which is perpendicular to a top surface of the forming table to cause the forming material to be deposited in the first direction, a second discharging in which the forming material is continuously discharged from the nozzle while changing the position of the nozzle with respect to the forming table in a second direction which is parallel to the top surface of the forming table to dispose the forming material along the second direction, and repeating the first discharging and the second discharging.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Embodiment 1-1. Configuration of Three-Dimensional Forming Apparatus

Figure 1:
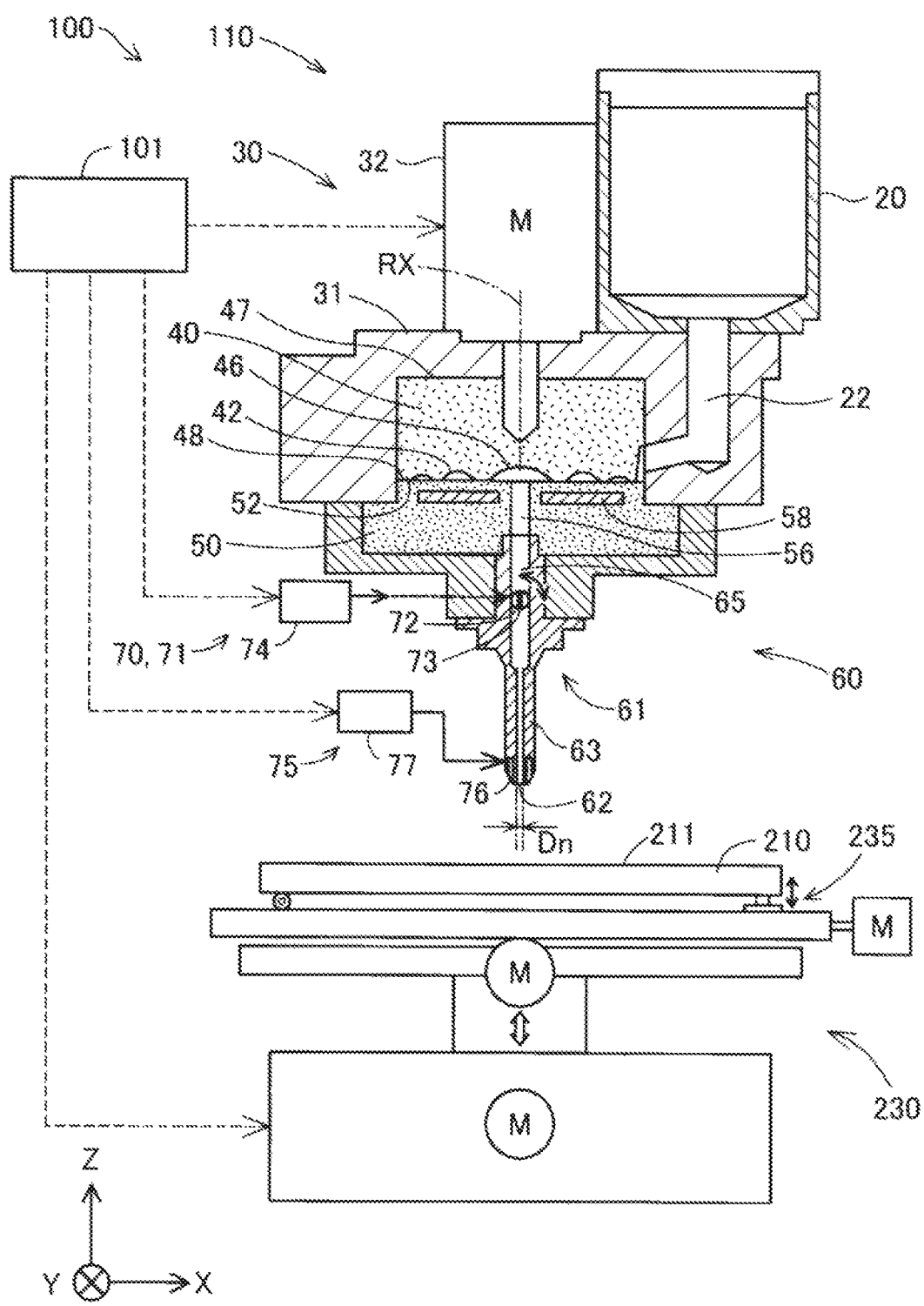
FIG. 1 is a schematic diagram illustrating the configuration of a three-dimensional forming apparatus.

FIG. 1 is a schematic diagram illustrating the configuration of a three-dimensional forming apparatus 100 which is suitable for executing the manufacturing method of a three-dimensional formed object in the present embodiment. In FIG. 1, arrows are depicted indicating X, Y, and Z directions which orthogonally intersect each other. In the present embodiment, the X direction and the Y direction indicate horizontal directions and are directions which are parallel to a horizontal plane. The Z direction indicates a height direction and is an opposite direction from a gravity direction or a plumb direction. The arrows indicating the X, Y, and Z directions are also depicted, as appropriate, in the other reference drawings such that the depicted directions correspond to those of FIG. 1.

The three-dimensional forming apparatus 100 forms a three-dimensional formed object by depositing a forming material. Hereinafter, "the three-dimensional forming apparatus" will also be referred to as simply "the forming apparatus" and "the three-dimensional formed object" will also be referred to as simply "the formed object". The forming apparatus 100 is provided with a control unit 101, a forming unit 110, a forming table 210, and a movement mechanism 230.

The control unit 101 controls the overall operation of the forming apparatus 100 and executes a forming process which forms the formed object. In the first embodiment, the control unit 101 is configured by a computer which is provided with one or a plurality of processors and a main memory device. The control unit 101 exhibits various functions by the processor executing a program or commands which are read onto the main memory device. The control unit 101 may be realized by a configuration in which a plurality of circuits for realizing each function are combined instead of configuring the control unit 101 using a computer. The forming process which is executed by the control unit 101 will be described later.

The forming unit 110 disposes a forming material, which is obtained by melting at least a portion of a material to render the material paste form, on the forming table 210. The forming unit 110 is provided with a material supply unit 20, a forming material generating unit 30, and a discharging unit 60.

The material supply unit 20 supplies the material which serves as the feedstock of the forming material to the forming material generating unit 30. The material supply unit 20 is configured by a hopper which stores the material, for example. The material supply unit 20 includes a discharge port on the bottom of the material supply unit 20 and the discharge port is connected to the forming material generating unit 30 via a communicating path 22. The material is inserted into the material supply unit 20 in a solid material state such as pellets or a powder. The material which is input into the material supply unit 20 will be described later.

The forming material generating unit 30 generates a fluid paste-form forming material which is obtained by melting at least a portion of a material which is supplied from the material supply unit 20 and guides the forming material to a discharging unit 60. In the present embodiment, the forming material generating unit 30 includes a screw case 31, a drive motor 32, a flat screw 40, and a screw surface facing portion 50.

The screw case 31 stores the flat screw 40. The flat screw 40 has a substantially columnar shape in which the height in the axial direction, which is a direction along the center axis, is smaller than the diameter. The flat screw 40 is disposed such that the axial direction is parallel to the Z direction and the flat screw 40 rotates along a circumferential direction. In the first embodiment, the center axis of the flat screw 40 matches a rotational axis RX of the flat screw 40. In FIG. 1, the rotational axis RX of the flat screw 40 is depicted using a dot-dash line.

The flat screw 40 is connected to the drive motor 32 which is disposed on the screw case 31 on a top surface 47 side. The flat screw 40 rotates inside the screw case 31 due to a rotational driving force which is generated by the drive motor 32. The drive motor 32 is driven under the control of the control unit 101.

In the flat screw 40, groove portions 42 are formed in a bottom surface 48 which is a surface which intersects the rotational axis RX. The communicating path 22 of the material supply unit 20 which is described above is connected to the groove portions 42 from the side surface of the flat screw 40.

The bottom surface 48 of the flat screw 40 faces a top surface 52 of the screw surface facing portion 50 and a space is formed between the groove portions 42 of the bottom surface 48 of the flat screw 40 and the top surface 52 of the screw surface facing portion 50. In the forming unit 110, the material is supplied from the material supply unit 20 in the space between the flat screw 40 and the screw surface facing portion 50. A description will be given later of the specific configuration of the flat screw 40 and the groove portions 42.

A heater 58 for heating the material is embedded in the screw surface facing portion 50. At least a portion of the material which is supplied into the groove portions 42 of the flat screw 40 which is rotating flows along the groove portions 42 while being melted and is guided to a center portion 46 of the flat screw 40 according to the rotation of the flat screw 40. The paste-form material which flows into the center portion 46 is supplied to the discharging unit 60 as the forming material via a communicating hole 56 which is provided in the center of the screw surface facing portion 50. For the forming material, it is desirable that the viscosity be adjusted in the forming material generating unit 30 to the extent that the fluidity is suppressed after the forming material is discharged from a nozzle 61 to be disposed on a planned part.

The discharging unit 60 includes the nozzle 61, a flow path 65, a discharge control mechanism 70, and a cooling unit 75. The nozzle 61 is connected to the communicating hole 56 of the screw surface facing portion 50 through the flow path 65. The flow path 65 is a flow path of the forming material between the flat screw 40 and the nozzle 61. The nozzle 61 discharges the forming material which is generated in the forming material generating unit 30 toward the forming table 210 from a discharge port 62 of the tip of the nozzle 61. In the present embodiment, the nozzle 61 is configured to discharge the forming material in the gravity direction. The discharge port 62 of the nozzle 61 has a substantially circular opening shape and has a bore diameter Dn.

It is desirable that the nozzle 61 include a tube-shaped extending portion 63 which is slightly thicker than the size of the bore diameter Dn and extends in the Z direction. Due to the nozzle 61 including the extending portion 63, since it is possible to cause the nozzle 61 to enter a gap in the formed object which is already formed on the forming table 210, it becomes possible to perform more detailed and fine formation.

The discharge control mechanism 70 controls the flowing out of the forming material from the nozzle 61. In the present embodiment, the discharge control mechanism 70 is configured by an opening-closing mechanism 71 which opens or closes the flow path 65. The opening-closing mechanism 71 is provided in the flow path 65 and opens and closes the flow path 65 to control the flow of the forming material. In the present embodiment, the opening-closing mechanism 71 is configured by a butterfly valve. The opening-closing mechanism 71 is provided with a drive shaft 72, a valve body 73, and a valve drive unit 74.

The drive shaft 72 is a shaft-shaped member which extends in one direction. The drive shaft 72 is attached to the exit of the flow path 65 to intersect the flow direction of the forming material. In the first embodiment, the drive shaft 72 is attached to be perpendicular to the flow path 65. In FIG. 1, the drive shaft 72 is perpendicular to the paper surface. The drive shaft 72 is attached to be capable of rotating centered on a center axis of the drive shaft 72.

The valve body 73 is a plate-shaped member which rotates inside the flow path 65. In the first embodiment, the valve body 73 is formed by machining a part which is disposed inside the flow path 65 of the drive shaft 72 into a plate shape. The shape of the valve body 73, when viewed in a direction which is perpendicular to the plate surface, substantially matches the opening shape of the flow path 65 at the part at which the valve body 73 is disposed.

The valve drive unit 74 generates a rotational driving force which rotates the drive shaft 72 under the control of the control unit 101. The valve drive unit 74 is configured by a stepping motor, for example. The valve body 73 rotates inside the flow path 65 according to the rotation of the drive shaft 72.

As illustrated in FIG. 1, a state in which the plate surface of the valve body 73 runs parallel to the flow direction of the forming material in the flow path 65 is a state in which the flow path 65 is open. In this state, the flowing of the forming material from the flow path 65 into the nozzle 61 is allowed. A state in which the plate surface of the valve body 73 is perpendicular to the flow direction of the forming material in the flow path 65 is a state in which the flow path 65 is closed. In this state, the flowing of the forming material from the flow path 65 into the nozzle 61 is blocked.

The cooling unit 75 cools the forming material which is discharged from the discharge port 62 of the nozzle 61 to lower the fluidity of the forming material. In the present embodiment, the cooling unit 75 is configured by an air blowing unit which blows air toward the forming material which is discharged from the nozzle 61 under the control of the control unit 101. The cooling unit 75 includes an air blowing port 76 and an air blowing fan 77.

The air blowing port 76 is attached to the tip of the nozzle 61. It is desirable that the air blowing port 76 be provided to surround the periphery of the discharge port 62 of the nozzle 61. The air blowing port 76 is connected to the air blowing fan 77 by a tubing member such as a tube and sends out the blown air which is generated by the air blowing fan 77 toward the discharge port 62 of the nozzle 61. The driving of the air blowing fan 77 is controlled by the control unit 101.

The forming table 210 includes a top surface 211 which faces the discharge port 62 of the nozzle 61. The top surface 211 is parallel to the X and Y directions in a standard posture in which the top surface 211 is not inclined by an angular displacement mechanism 235 (described later). As described later, in the forming apparatus 100, the forming material is deposited on the top surface 211 of the forming table 210 and a formed object is formed.

In the following explanation, a direction perpendicular to the top surface 211 of the forming table 210 is also referred to as "a first direction" and a direction parallel to the top surface 211 of the forming table 210 is also referred to as "a second direction". In a case in which the top surface 211 of the forming table 210 is disposed horizontally, the first direction is parallel with the plumb direction and is parallel with the Z direction. The second direction is parallel with the horizontal direction and is parallel with the X direction and the Y direction. In the following explanation, when "the first direction" and "the second direction" are referred to with regard to the formed object after completion, this means the directions in the posture when the formed object is formed on the forming table 210.

Under the control of the control unit 101, the movement mechanism 230 moves the forming table 210 to modify the relative positional relationship between the nozzle 61 and the forming table 210. In the present embodiment, the movement mechanism 230 is provided with a three-axis positioner which causes the forming table 210 to move in the three axial directions of the X, Y, and Z directions using the driving force of three motors M.

In the forming apparatus 100, instead of a configuration in which the forming table 210 is moved by the movement mechanism 230, a configuration may be adopted in which the movement mechanism 230 moves the position of the nozzle 61 in a state in which the position of the forming table 210 is fixed. Even in this configuration, it is possible to modify the relative positional relationship between the nozzle 61 and the forming table 210.

It is desirable that the movement mechanism 230 further include a mechanism which modifies the angle of the nozzle 61 with respect to the top surface 211 of the forming table 210. In the present embodiment, the movement mechanism 230 is provided with the angular displacement mechanism 235 which is capable of inclining the angle of the top surface 211 of the forming table 210 from horizontal under the control of the control unit 101. It is possible to realize the angular displacement mechanism 235 using a configuration which raises one side of the forming table 210 in the X direction using a solenoid mechanism or the like, for example, to incline the top surface 211 of the forming table 210 with respect to the X direction. Since it is possible to modify the posture of the nozzle 61 with respect to the formed object during the forming by being capable of modifying the angle of the nozzle 61 with respect to the top surface 211 of the forming table 210, the degree of freedom of the forming may be increased.

In the forming apparatus 100, instead of providing a mechanism which inclines the top surface 211 of the forming table 210 in the movement mechanism 230, a mechanism capable of modifying the angle of the nozzle 61 with respect to the top surface 211 of the forming table 210 may be provided on the discharging unit 60. Even in this configuration, it is possible to modify the posture of the nozzle 61 with respect to the formed object during the forming and the degree of freedom of the forming may be increased.

Figure 2:
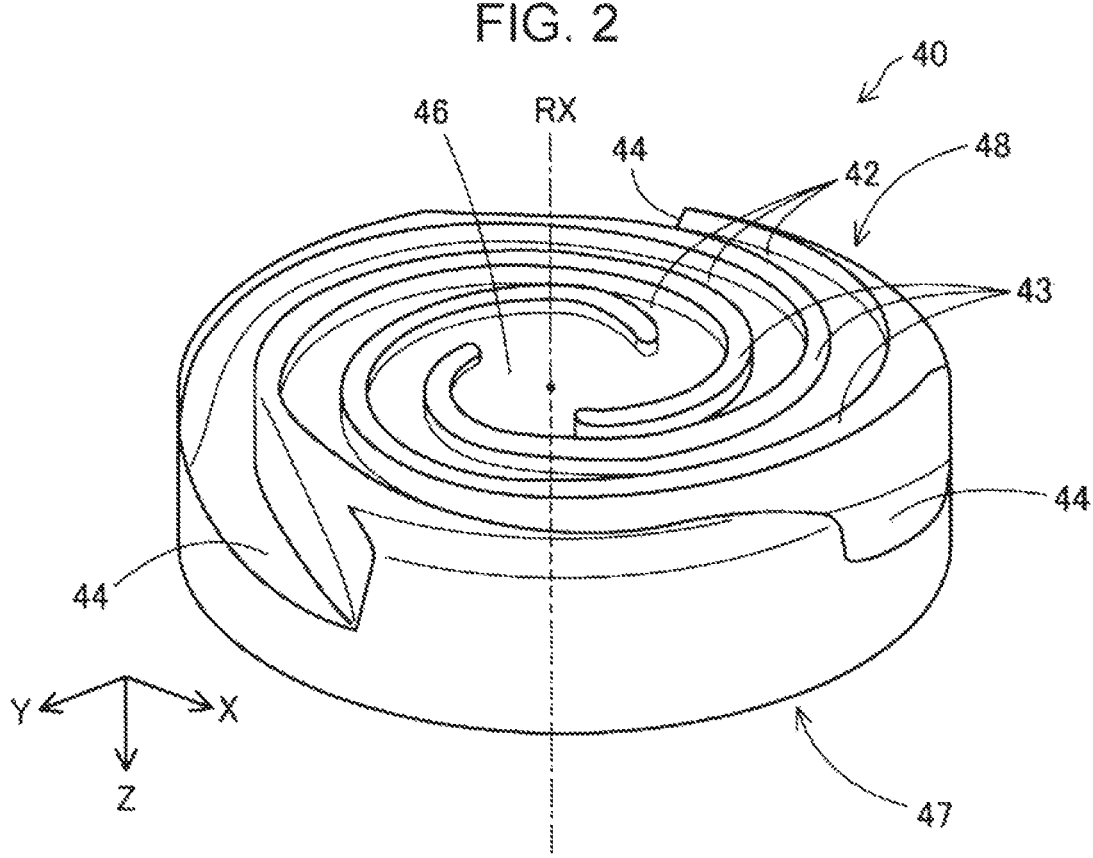
FIG. 2 is a schematic perspective view illustrating the configuration of a flat screw.

FIG. 2 is a schematic perspective view illustrating the configuration of the bottom surface 48 side of the flat screw 40. In FIG. 2, the position of the rotational axis RX of the flat screw 40 during the rotation in the forming material generating unit 30 is depicted using a dot-dash line. As explained with reference to FIG. 1, the groove portions 42 are provided in the bottom surface 48 of the flat screw 40 which faces the screw surface facing portion 50. Hereinafter, the bottom surface 48 will also be referred to as "the groove forming surface 48".

The center portion 46 of the groove forming surface 48 of the flat screw 40 is configured as a recessed portion to which one end of each of the groove portions 42 is connected. The center portion 46 faces the communicating hole 56 of the screw surface facing portion 50 which is depicted in FIG. 1. In the present embodiment, the center portion 46 intersects the rotational axis RX.

The groove portions 42 of the flat screw 40 configure so-called scroll grooves. Each of the groove portions 42 extends in a spiral shape to draw an arc from the center portion 46 toward the outer circumference of the flat screw 40. The groove portions 42 may be configured to extend in a helical shape. Ridge portions 43 which configure side wall portions of the groove portions 42 and extend along each of the groove portions 42 are provided on the groove forming surface 48.

The groove portions 42 continue to a material inflow port 44 which is formed in the side surface of the flat screw 40. The material inflow port 44 is a portion which accepts the material which is supplied via the communicating path 22 of the material supply unit 20.

When the flat screw 40 rotates, at least a portion of the material which is supplied from the material inflow port 44 is melted while being heated inside the groove portions and the fluidity increases. The material flows to the center portion 46 through the groove portions 42, gathers at the center portion 46, and is guided to the nozzle 61 and is discharged from the discharge port 62 by the internal pressure which is generated by the gathering.

FIG. 2 illustrates an example of the flat screw 40 which includes three of the groove portions 42 and three of the ridge portions 43. The number of the groove portions 42 and the ridge portions 43 which are provided on the flat screw 40 is not limited to three. Only one of the groove portions 42 may be provided on the flat screw 40, and a plurality greater than or equal to two of the groove portions 42 may be provided on the flat screw 40. A predetermined number of the ridge portions 43 may be provided to match the number of the groove portions 42.

FIG. 2 illustrates an example of the flat screw 40 in which the material inflow port 44 is formed at three locations. The number of the material inflow ports 44 which are provided in the flat screw 40 is not limited to the three locations. The material inflow port 44 may be provided at only the one location in the flat screw 40, and may be provided at a plurality of greater than or equal to two locations.

Figure 3:
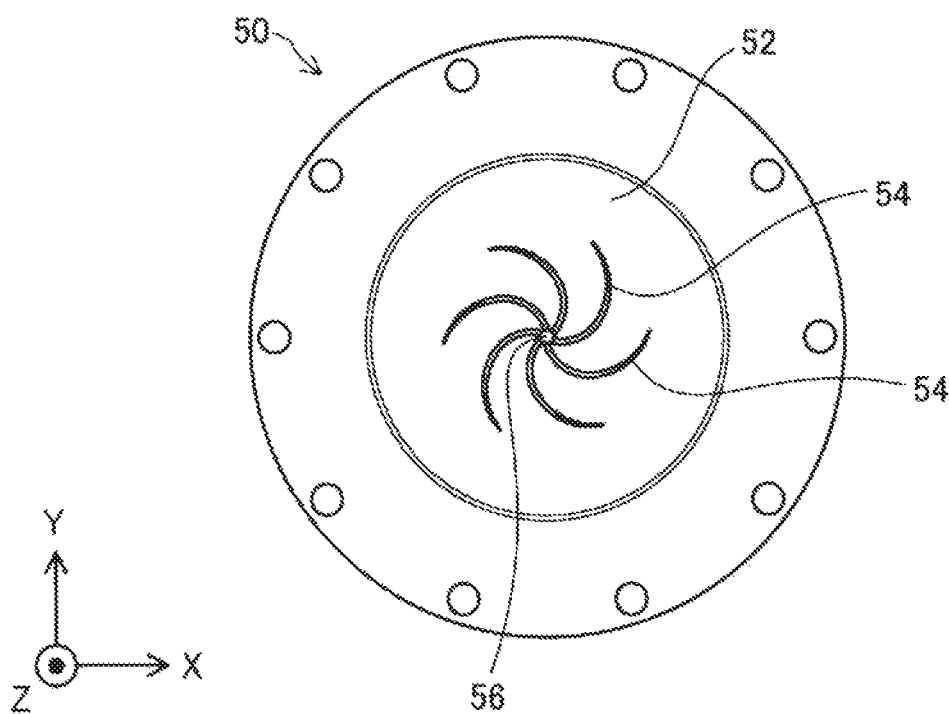
FIG. 3 is a schematic plan view illustrating a screw surface facing portion.

FIG. 3 is a schematic perspective view illustrating the top surface 52 side of the screw surface facing portion 50. As described above, the top surface 52 of the screw surface facing portion 50 faces the groove forming surface 48 of the flat screw 40. Hereinafter, the top surface 52 will also be referred to as "the screw facing surface 52". The communicating hole 56 (described above) for supplying the forming material to the nozzle 61 is formed in the center of the screw facing surface 52.

A plurality of guide grooves 54 which are connected to the communicating hole 56 and extend in a spiral shape from the communicating hole 56 toward the outer circumference are formed in the screw facing surface 52. The plurality of guide grooves 54 have a function of guiding the fluid material, at least a portion of which is melted, to the communicating hole 56. As explained with reference to FIG. 1, the heater 58 for heating the material is embedded in the screw surface facing portion 50. The melting of the material in the forming material generating unit 30 is realized through the heating by the heater 58 and the rotation of the flat screw 40.

Reference will be given to FIG. 1. By using the flat screw 40 which has a small size in the Z direction in the forming unit 110, the area occupied in the Z direction by the path for melting and guiding at least a portion of the material to the nozzle 61 is reduced. In this manner, by using the flat screw 40 in the forming apparatus 100, the generation mechanism of the forming material which is realized in the discharging unit 60 is reduced in size.

By using the flat screw 40 in the forming apparatus 100, the configuration which blows the material in the fluid state into the flow path 65 is easily realized. Accordingly, the discharge control of the forming material by the discharge control mechanism 70 of a simple configuration which is provided downstream of the flow path 65 becomes possible and the precision of the discharge control of the forming material from the nozzle 61 is increased.

1-2. Material Used in Forming

A description will be given of the material which is used in the forming apparatus 100. In the forming apparatus 100, it is possible to form the formed object using various materials such as a material having plasticity, a metal material, or a ceramic material, for example, as a main material. Here, "the main material" means a material which is central to forming the shape of the formed object and means a material which occupies a content of greater than or equal to 50 wt % in the formed object. The forming material which is described above includes a forming material in which the main materials described above are melted in isolation, and a forming material in which a component which is a portion contained together with the main material is melted and rendered paste form.

In a case in which a thermoplastic material is used as the main material, the forming material is generated by the material being plasticized in the forming material generating unit 30. The term "plasticize" means a heat is applied to the thermoplastic material and the material is melted.

It is possible to use a thermoplastic resin material, for example, as the thermoplastic material.

Examples of Thermoplastic Resin Material

General purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate. Engineering plastics such as polysulfone, polyethersulfone, polyphenylene sulfide, polyarylate, polyimide, polyamide imide, polyether imide, and polyether ether ketone.

In addition to pigments, metals, and ceramics, additives such as wax, flame retardant, antioxidant, thermal stabilizer may be mixed into the thermoplastic material. The thermoplastic material is plasticized by the rotation of the flat screw 40 and the heating of the heater 58 in the forming material generating unit 30 and is transformed to a melted state. The forming material which is generated in this manner is disposed on the forming table 210 and is subsequently cured by a reduction in temperature.

It is desirable that the thermoplastic material be heated to a glass transition point or greater and be ejected from the nozzle 61 in a completely melted state. For example, the glass transition point of ABS resin is approximately 120° C. and it is desirable that the ABS resin be approximately 200° C. at the time of ejection from the nozzle 61. A heater may be provided in the periphery of the nozzle 61 in order to eject the forming material in such a high-temperature state.

In the forming apparatus 100, the following metal materials may be used as the main material, for example, instead of the thermoplastic material which is described above. In this case, it is desirable that a component which melts during the generation of the forming material be mixed into a powder material obtained by rendering the following metal materials into a powder form and the result be inserted into the forming material generating unit 30.

Examples of Metal Material

A single metal or an alloy containing one or more metals from among magnesium (Mg), iron (Fe), cobalt (Co), chrome (Cr), aluminum (Al), titanium (Ti), copper (Cu), and nickel (Ni).

Examples of Alloy

Maraging steel, stainless steel, cobalt chromium molybdenum, titanium alloy, nickel alloy, aluminum alloy, cobalt alloy, and cobalt chromium alloy.

It is possible to use a ceramic material as the main material instead of the metal material in the forming apparatus 100. For example, it is possible to use oxide ceramics such as silicon dioxide, titanium dioxide, aluminum oxide, and zirconium oxide, and non-oxide ceramics such as aluminum nitride as the ceramic material. In a case in which a metal material or a ceramic material such as those described above is used as the main material, the forming material which is disposed on the forming table 210 may be cured by sintering.

The powder material of the metal material or the ceramic material which is inserted into the material supply unit 20 may be a mixed material in which a plurality of types of powders of a single metal, powders of alloys, and powders of ceramic material are mixed together. The powder material of the metal material or the ceramic material may be coated with a thermoplastic resin such as those exemplified above, or alternatively, a different thermoplastic resin, for example.

In this case, in the forming material generating unit 30, the fluidity may be realized by melting the thermoplastic resin.

It is possible to add the following solvents, for example, to the powder material of the metal material or the ceramic material which is inserted into the material supply unit 20. It is possible to use one species or two or more species in combination in combination as the solvent.

Examples of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and isobutyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetraalkyl ammonium acetates; sulfoxide solvents such as dimethyl sulfoxide, and diethyl sulfoxide; pyridine-based solvents such as pyridine, γ-picoline, and 2,6-lutidine; tetraalkyl ammonium acetate (for example, tetrabutyl ammonium acetate or the like); and ionic liquids such as butyl carbitol acetate.

It is possible to add the following binders, for example, to the powder material of the metal material or the ceramic material which is inserted into the material supply unit 20.

Examples of Binder

Acrylic resin, epoxy resin, silicone resin, cellulose resin, or alternatively, another synthetic resin or polylactic acid (PLA), polyamide (PA), polyphenylene sulfide (PPS), polyether ether ketone (PEEK), or alternatively, another thermoplastic resin.

1-3. Forming Process

A description will be given of the forming process which is executed by the control unit 101 in the forming apparatus 100 with reference to FIGS. 4A to 8, in order. The control unit 101 repeatedly executes a first discharge control and a second discharge control to form a formed object in the forming process. Hereinafter, a description will be given of the forming of the first discharge control with reference to FIGS. 4A to 4D and a description will be given of the forming of the second discharge control with reference to FIG. 5. FIGS. 4A to 4D and FIG. 5 each schematically depict a state in which the forming material which is discharged from the nozzle 61 is deposited on the top surface 211 of the forming table 210.

1-3-1. Forming of First Discharge Control

Figure 4A:
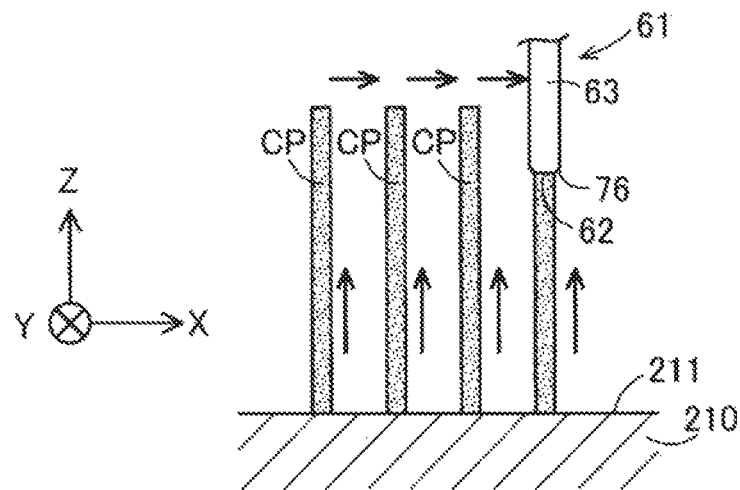
FIG. 4A is a first schematic diagram for explaining the content of a first discharge control.

Reference will be given to FIG. 4A. In the first discharge control, the control unit 101 causes the forming material to be continuously discharged from the nozzle 61 onto the forming table 210 while causing the forming apparatus 100 to change the position of the nozzle 61 in the first direction with respect to the forming table 210 to deposit the forming material in the first direction. The expression "continuously discharge the forming material" means to discharge the forming material in a connected state without breaks. Columnar parts CP which extend along the first direction are formed by this operation. At least a portion of the columnar parts CP is formed by causing the melted-state forming material to be continuously deposited in the first direction. Therefore, the strength with respect to an external force pulling in the first direction is higher than in a case in which a similar shape to the columnar parts CP is formed using a method in which a step of newly disposing the forming material onto a layer in which the forming material is cured to form layers is repeated to stack a plurality of layers in the first direction.

It is possible to form the columnar parts CP at a height of less than or equal to 3 mm. The columnar parts CP may be formed at different heights from each other. The diameter of each of the columnar parts CP is substantially the same as the bore diameter Dn of the nozzle 61 which is illustrated in FIG. 1. In the present specification, the expression 'substantially the same" means to match within a margin of error of less than or equal to ±5%. It is possible to increase the diameter of each of the columnar parts CP to be greater than the bore diameter Dn of the nozzle 61 by adjusting the discharge pressure of the forming material and the viscosity of the forming material such that the forming material expands in the width direction, that is, the second direction when the forming material is discharged from the nozzle 61 and is deposited.

After the first discharge control, the control unit 101 may repeat the first discharge control in which the position of the nozzle 61 is caused to move in the second direction with respect to the forming table 210 and the columnar parts CP are formed. The control unit 101 forms the single columnar part CP while causing the position of the nozzle 61 to move upward with respect to the forming table 210. Subsequently, the control unit 101 stops the continuous discharging of the forming material from the nozzle 61 by the discharge control mechanism 70 and causes the position of the nozzle 61 to move in the second direction with respect to the forming table 210. After the position of the nozzle 61 is caused to approach the top surface 211 of the forming table 210, the control unit 101 causes the forming material to be continuously discharged from the nozzle 61 while moving the nozzle 61 upward with respect to the forming table 210 to form the next columnar part CP. It is possible to continuously form the plurality of columnar parts CP in a disconnected state using a step of repeating the first discharge control.

Figure 4B:
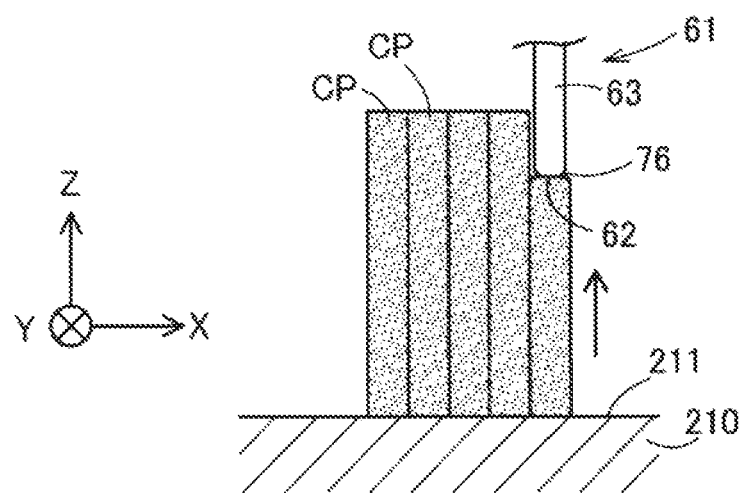
FIG. 4B is a second schematic diagram for explaining the content of the first discharge control.

Reference will be given to FIG. 4B. By narrowing the arrangement interval of the columnar parts CP in the step of repeating the first discharge control, it is possible to arrange the columnar parts CP such that the columnar parts CP are in contact with each other. In this case, it is desirable that the diameter of the columnar part CP be greater than the bore diameter Dn of the nozzle 61. Due to the nozzle 61 including the extending portion 63, even in a case in which the columnar parts CP are arranged and formed to be in contact with each other, it is possible to suppress the nozzle 61 interfering with the columnar parts CP which are already formed.

Figure 4C:
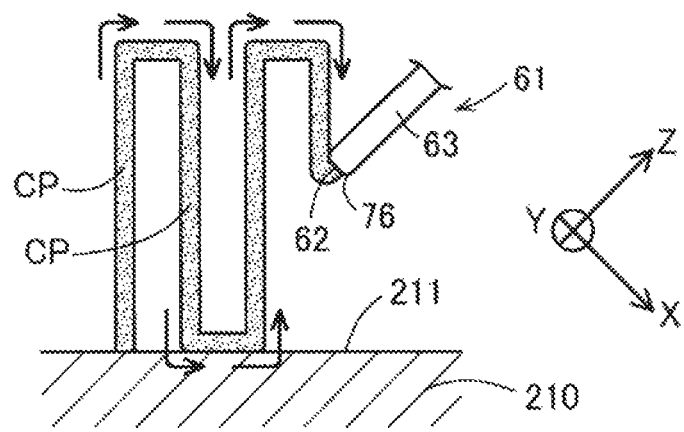
FIG. 4C is a third schematic diagram for explaining the content of the first discharge control.

Reference will be given to FIG. 4C. By executing the first discharge control as described below, the control unit 101 is capable of continuously forming the plurality of columnar parts CP in a state in which the columnar parts CP are connected to each other. First, the control unit 101 executes the first discharge control in which the forming material is continuously discharged from the nozzle 61 to deposit the forming material in the first direction while changing the position of the nozzle 61 with respect to the forming table 210 in a direction separating from the forming table 210 from among the first directions. Accordingly, the columnar parts CP are formed to extend upward from the top surface 211 of the forming table 210.

Next, the control unit 101 causes the position of the nozzle 61 to move in the second direction with respect to the forming table 210 with the forming material still being discharged from the nozzle 61. At this time, it is desirable that the viscosity of the forming material, the movement speed of the nozzle 61, and the discharge amount of the forming material be adjusted such that the forming material which is discharged from the nozzle 61 does not fall from the part which is previously formed.

The control unit 101 inclines the top surface 211 of the forming table 210 using the angular displacement mechanism 235 of the movement mechanism 230. Accordingly, it is possible to render the nozzle 61 an inclined state with respect to the top surface 211 of the forming table 210. In this state, the control unit 101 executes the first discharge control in which the forming material is continuously discharged from the nozzle 61 while causing the position of the nozzle 61 to move with respect to the forming table 210 in a direction approaching the forming table 210 among the first directions. Accordingly, it is possible to form the columnar parts CP to extend downward toward the top surface 211 of the forming table 210.

Figure 4D:
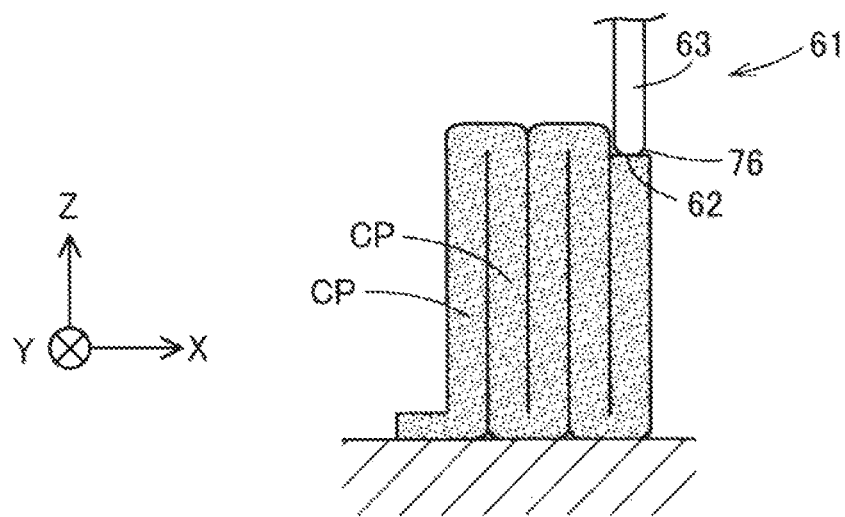
FIG. 4D is a fourth schematic diagram for explaining the content of the first discharge control.

The control unit 101 restores the top surface 211 of the forming table 210 to horizontal using the movement mechanism 230. It is possible to form the next columnar part CP by causing the position of the nozzle 61 to move in the second direction with respect to the forming table 210 with the forming material still being discharged from the nozzle 61, and subsequently executing the first discharge control again. It is possible to continuously form the plurality of columnar parts CP which are connected to each other by repeating the steps which are described above. As illustrated in FIG. 4D, by narrowing the arrangement interval of the columnar parts CP, it is possible to arrange the columnar parts CP in a state in which the columnar parts CP are in contact with each other. In this case, it is desirable that the diameter of the columnar part CP be greater than the bore diameter Dn of the nozzle 61.

It is desirable that, in the first discharge control, the control unit 101 cause the forming material which is discharged to be cooled by the cooling unit 75 when the forming material is discharged from the nozzle 61. Accordingly, it is possible to swiftly lower the fluidity of the forming material directly after the forming material is discharged. Accordingly, it is possible to suppress the flowing of the forming material after the discharging and a reduction in the forming precision of the part which is formed by the first discharge control.

1-3-2. Second Discharge Control

Figure 5:
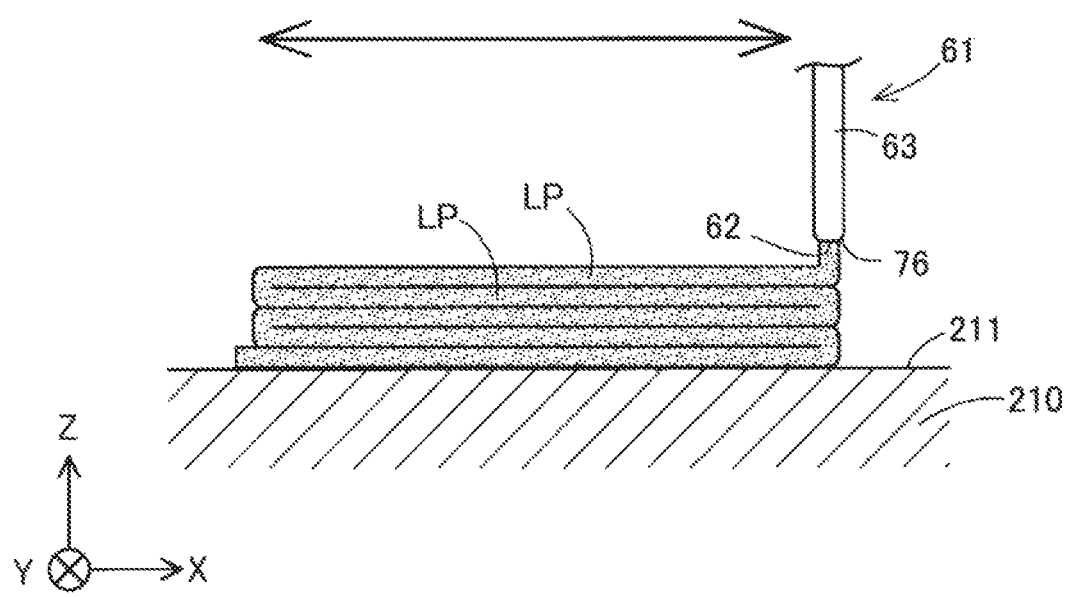
FIG. 5 is a schematic diagram for explaining the content of a second discharge control.

Reference will be given to FIG. 5. In the second discharge control, the control unit 101 causes the forming apparatus 100 to perform an operation of causing the forming material to be continuously discharged from the nozzle 61 while changing the position of the nozzle 61 in the second direction with respect to the forming table 210 to cause the forming material to be disposed along the second direction. Linear parts LP are formed along the second direction by the operation of the second discharge control. Since the linear parts LP are formed by the forming material being continuously deposited in the second direction, the linear parts LP have high strength with respect to an external pulling force in the second direction.

After executing the second discharge control, the control unit 101 may repeat the operation of the second discharge control in which the position of the nozzle 61 is caused to move in the first direction with respect to the forming table 210 and the linear part LP are formed. After forming a single columnar part CP while causing the nozzle 61 to move in the second direction, the control unit 101 causes the position of the nozzle 61 to move in the first direction with respect to the forming table 210. The control unit 101 causes the forming material to be discharged from the nozzle 61 onto the linear part LP which is previously formed to stack the next linear part LP. Using the second discharge control, the control unit 101 may form the linear part LP to extend in the second direction in a state in which the bottom side is not supported from the part which is previously formed to form a so-called undercut shape.

When continuously repeating the second discharge control, the control unit 101 may perform the next operation between the second discharge control and the next second discharge control. In other words, the control unit 101 may control the discharge control mechanism 70 to temporarily stop the continuous discharging of the forming material from the nozzle 61 and change the position of the nozzle 61 with respect to the forming table 210 and subsequently restart the continuous discharging of the forming material from the nozzle 61. Accordingly, it is possible to more freely perform the formation of various shapes.

In the second discharge control, it is desirable that the control unit 101 cool the discharged forming material using the cooling unit 75. Accordingly, it is possible to swiftly reduce the fluidity of the forming material directly after the discharging, and it is possible to suppress the flowing of the forming material after the discharging and a reduction in the forming precision of the part which is formed by the second discharge control.

Incidentally, it is desirable that, in the second discharge control, when forming the linear part LP, a gap G be maintained between the discharge port 62 of the tip of the nozzle 61 and a planned part at which the forming material which is discharged from the nozzle 61 is to be stacked. It is desirable that the size of the gap G be greater than or equal to the bore diameter Dn (illustrated in FIG. 1) in the discharge port 62 of the nozzle 61, and it is more preferable that the size of the gap G be greater than or equal to 1.1 times the bore diameter Dn. Accordingly, the forming material which is discharged from the discharge port 62 of the nozzle 61 is stacked in a free state in which the forming material is not pushed downward. As a result, it is possible to suppress the crushing of the horizontal sectional shape of the forming material which is discharged from the nozzle 61, and it is possible to reduce the surface roughness of the formed object. In a configuration in which a heater is provided in the periphery of the nozzle 61, it is possible to prevent the overheating of the forming material by the heater by forming the gap G, and discoloration and degradation caused by the overheating of the stacked forming material are suppressed. Meanwhile, it is preferable that the size of the gap G be less than or equal to 1.5 times the bore diameter Dn, and it is particularly preferable that the size of the gap G be less than or equal to 1.3 times the bore diameter Dn. Accordingly, a reduction in the precision with respect to the planned part at which the forming material is to be disposed and a reduction in the close adherence between the linear parts LP which are stacked in the height direction are suppressed.

In the first discharge control and the second discharge control, the forming material is discharged onto the forming table 210 by the forming unit 110 which uses the flat screw 40. In other words, the first discharge control and the second discharge control may be interpreted as including a step of melting at least a portion of the material which is supplied to the rotating flat screw 40 to generate the forming material and discharging the forming material from the nozzle 61 toward the forming table 210. As described above, in the forming apparatus 100, the generating mechanism of the forming material is miniaturized and the precision of the discharge control of the forming material is increased by the usage of the flat screw 40. As long as the first discharge control and the second discharge control are executed by the forming apparatus 100 which uses the flat screw 40, it is possible to easily and efficiently perform the forming of the formed object.

1-4. Forming Example

A description will be given of various forming examples in which the first discharge control and the second discharge control are repeated to perform the forming, with reference to FIGS. 6A to 6C, 7, and 8. In the following referenced diagrams, different densities of hatching are given to the parts which are formed in the first discharge control and the parts which are formed in the second discharge control, for convenience. Hereinafter, a step in which the first discharge control is executed will also be referred to as "a first discharging step" and a step in which the second discharge control is executed will also be referred to as "a second discharging step". In the forming process, the forming apparatus 100 executes repeating in which the first discharging step and the second discharging step are repeated.

(1) First Forming Example

Figure 6A:
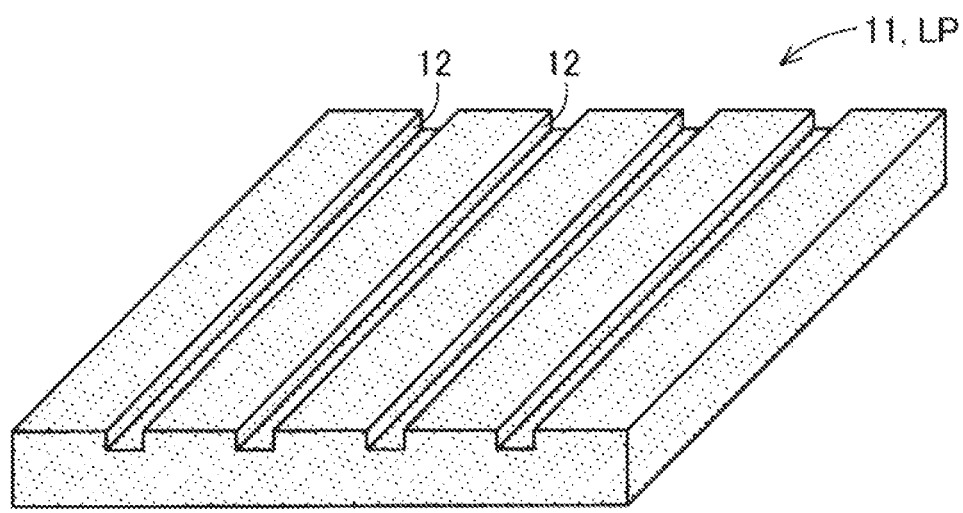
FIG. 6A is a first schematic diagram for explaining a first forming example.
Figure 6A:
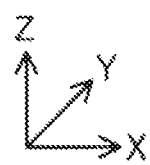
Figure 6B:
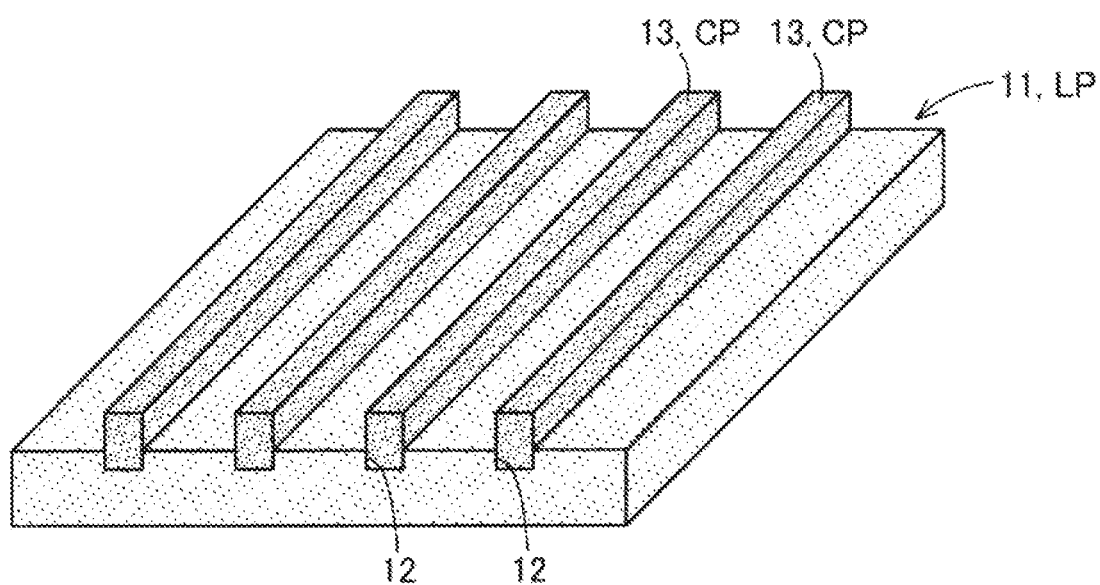
FIG. 6B is a second schematic diagram for explaining the first forming example.
Figure 6B:
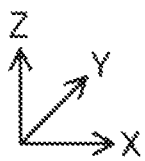
Figure 6C:
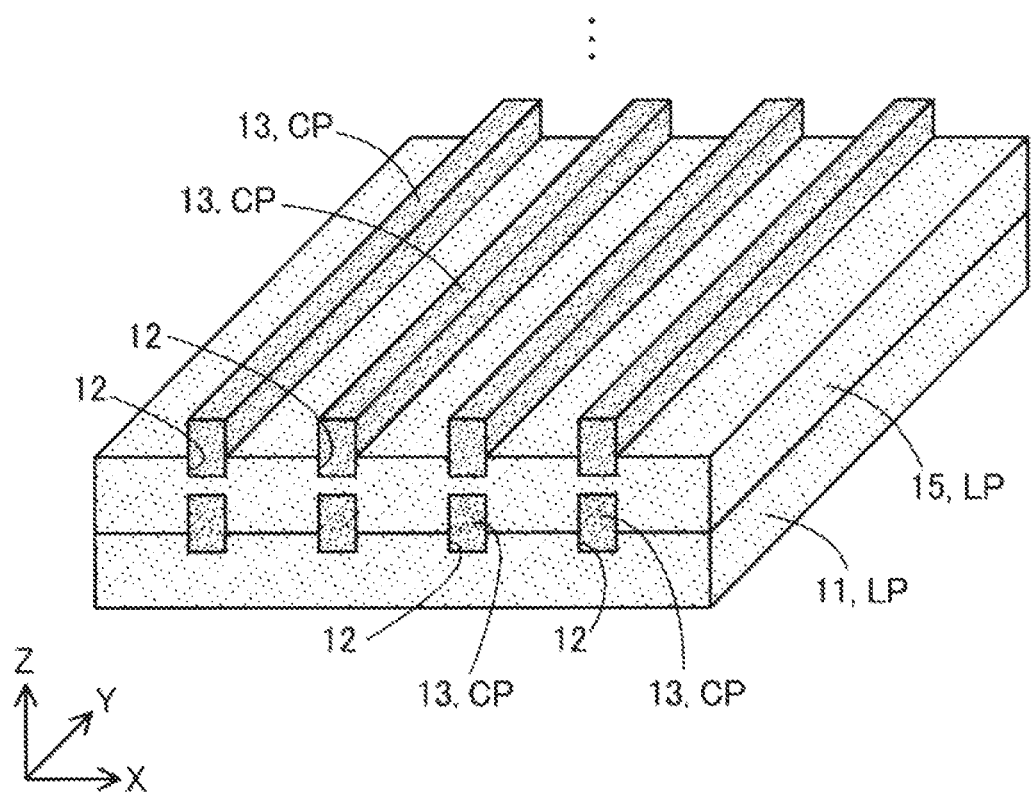
FIG. 6C is a third schematic diagram for explaining the first forming example.

FIGS. 6A to 6C are schematic diagrams for explaining the first forming example. Reference will be given to FIG. 6A. The first step is a step of forming a first material layer 11 using the second discharging step. In the first step, the control unit 101 repeats the second discharge control to cause the linear parts LP described in FIG. 5 to be arranged in the second direction and also to be stacked in the first direction to form the first material layer 11. The first material layer 11 is a layered body in which the linear parts LP are stacked in the first direction. In this step, recessed portions 12 which are depressed downward are formed in the top surface of the first material layer 11. In the example of FIG. 6A, the recessed portions 12 are configured as groove portions which extend in the Y direction. The recessed portions 12 may be configured as groove portions which extend in the X direction and may be configured as groove portions which are arranged in a lattice pattern. The recessed portions 12 may be configured as bottomed hole portions.

Reference will be given to FIG. 6B. The second step is a step of forming connecting portions 13 using the first discharging step. In the second step, the control unit 101 repeats the first discharge control to form the connecting portions 13 which are formed by arranging the columnar parts CP (described in FIGS. 4A to 4D) in the second direction, one in each of the recessed portions 12 of the first material layer 11. Each of the connecting portions 13 is formed to protrude upward from the top surface of the first material layer 11. The connecting portions 13 may be formed using any of the configurations of the columnar parts CP which are illustrated in FIGS. 4A to 4D.

Reference will be given to FIG. 6C. The third step is a step of forming a second material layer 15 using the second discharging step. In the third process, the control unit 101 repeats the second discharge control to form the second material layer 15 to be stacked on the first material layer 11. The second material layer 15 is formed in the same manner as the first material layer 11 by arranging the linear parts LP which are described in FIG. 5 in the second direction and also stacking the linear parts LP in the first direction. The second material layer 15 is a layered body of similar linear parts LP to those of the first material layer 11. The connecting portions 13 which are formed in the second step are embedded between the first material layer 11 and the second material layer 15. Subsequently, the connecting portions 13 may be formed in the recessed portions 12, which are formed in the top surface of the second material layer 15, by repeating the first discharge control, and similar layers, in which the linear parts LP are stacked, to those of material layers 15 and 16 may be stacked by repeating the second discharge control on the second material layer 15.

According to the first forming example, the connecting portions 13 are formed by the repeating of the first discharging step to straddle the plurality of material layers 11 and 15 which are formed by the repeating of the second discharging step and the material layers 11 and 15 which are a layered body in the first direction are connected to each other by the connecting portions 13. Since the connecting portions 13 are configured by the columnar parts CP which have high strength in the first direction which is the stacking direction of the material layers 11 and 15, the separation of the material layers 11 and 15 from each other is suppressed by the connecting portions 13. The separation of the linear parts LP which are included in the material layers 11 and 15 and are in contact with the connecting portions 13 from each other in the first direction is suppressed by the connecting portions 13. In this manner, if the formed object including the connecting portions 13 is formed, the strength of the formed object with respect to an external pulling force in the stacking direction in which the material layers 11 and 15 are stacked is increased. The separation of the linear parts LP which are stacked to be in contact with the connecting portions 13 from each other in the first direction is suppressed and the strength of the material layers 11 and 15 is increased. It is possible to interpret the repeating of the first discharging step and the second discharging step which form the first forming example as including a step of forming the parts which are formed by the first discharging step and the parts which are formed by the second discharging step to line up in the second direction.

In a case in which the material layers 15 and 16 are stacked in three or more layers, it is desirable that at least one connecting portion 13 be formed to be disposed in each boundary between the material layers 15 and 16. Accordingly, it is possible to increase the overall strength of the formed object in the stacking direction of the material layers 15 and 16. Alternatively, the plurality of connecting portions 13 may be formed to be arranged across the entire first direction in a state in which at least a portion of the plurality of connecting portions 13 overlaps when viewed from the second direction. Accordingly, it is possible to increase the overall strength of the material layers 15 and 16 in the first direction.

(2) Second Forming Example

Figure 7:
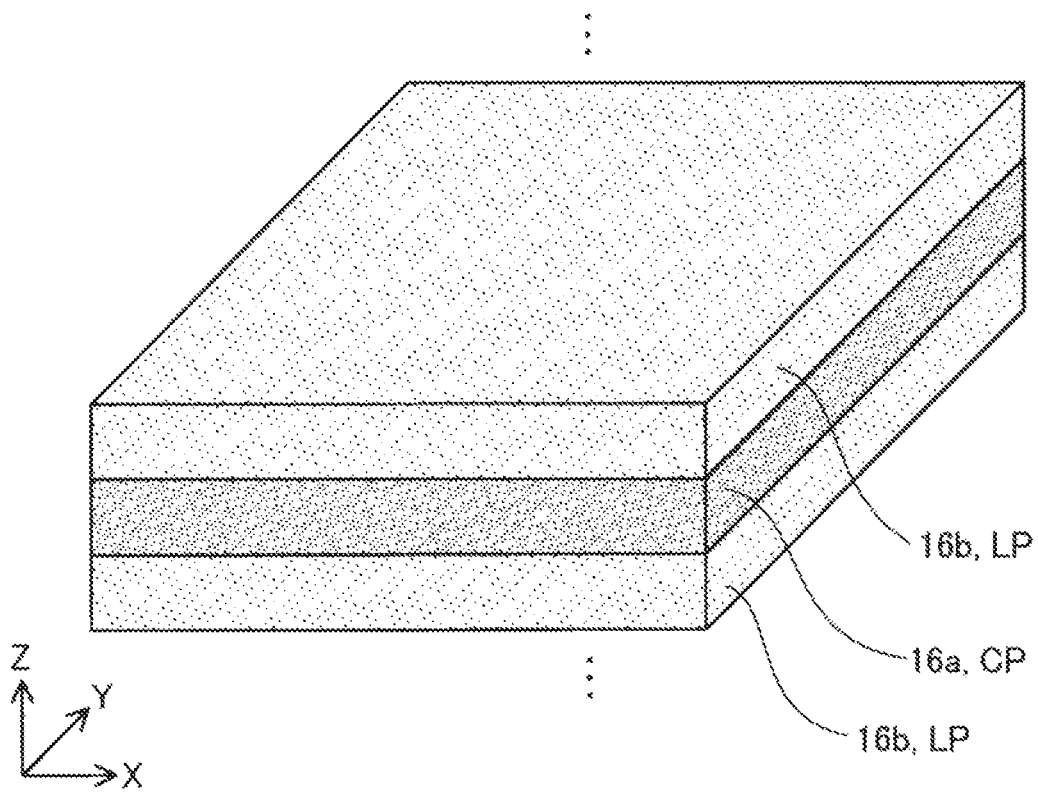
FIG. 7 is a schematic diagram for explaining the second forming example.

FIG. 7 is a schematic diagram for explaining the second forming example. In the second forming example, the formed object in which a material layer 16a and a material layer 16b are stacked alternately in the first direction is formed. The material layer 16a is formed by the first discharging step and the linear parts LP are stacked in the height direction and the material layer 16b is formed by the second discharging step and the columnar parts CP are arranged in the horizontal direction. In the second forming example, the formed object includes the material layer 16a which is configured by the columnar parts CP which have a high strength in the first direction which is the stacking direction of the material layers 16a and 16b. Therefore, the strength of the formed object in the first direction is increased as compared to a case in which the entirety of the formed object is formed by only the material layers 16*b* which are configured by the linear parts LP.

(3) Third Forming Example

Figure 8:
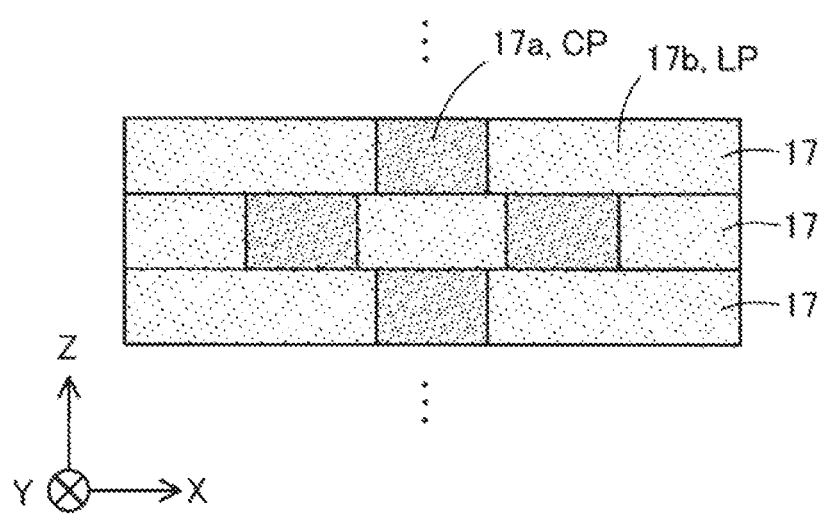
FIG. 8 is a schematic diagram for explaining the third forming example.

FIG. 8 is a schematic diagram for explaining the third forming example. In the third forming example, the formed object is formed by a plurality of composite layers 17 being stacked in the first direction. Each of the composite layers 17 includes first parts 17*a* and second parts 17*b*. The first parts 17*a* are formed by the first discharging step and are obtained by stacking the linear parts LP in the first direction, and the second parts 17*b* are formed by the second discharging step and are obtained by arranging the columnar parts CP in the second direction. Each of the composite layers 17 is formed by a step of forming the parts which are formed by the first discharging step and the parts which are formed by the second discharging step to line up in the second direction. According to the third forming example, each of the composite layers 17 includes the first parts 17*a* which are configured by the columnar parts CP. Therefore, the strength of each of the composite layers 17 is increased with respect to an external pulling force in the first direction.

1-5. Summary

As described above, the manufacturing method which is executed by the forming apparatus 100 of the present embodiment is provided with the first discharging step in which the first discharge control is executed, the second discharging step in which the second discharge control is executed, and a repeating in which the first discharging step and the second discharging step are repeated. Since parts which have high strength in the first direction are formed by the first discharging step in the formed object which is formed by the manufacturing method, the strength in the first direction of the formed object is increased as compared to a case in which the entirety of the formed object is formed by only the second discharging step. Additionally, according to the forming apparatus 100 and the manufacturing method of the present embodiment, it is possible to realize the various operations and effects which are described in the embodiment.

2. Other Embodiments

It is possible to modify the various configurations which are described in the embodiment in the manners described hereinafter, for example. All of the other embodiments which are described hereinafter are posited as examples for embodying the invention in the same manner as the embodiment which is described above.

2-1. First Other Embodiment

The example of the forming process in which the first discharging step and the second discharging step are repeated is not limited to the first forming example, the second forming example, and the third forming example which are described in the embodiment. For example, the first discharging step and the second discharging step may be repeated once each alternately to form the formed object. Even in this step, it is possible to obtain a formed object having higher strength than a formed object which is configured by only the parts which are formed only by the second discharging step.

2-2. Second Other Embodiment

The forming unit 110 may include a configuration which rotates a screw which is longer in the Z direction than the diameter to extrude the forming material from the nozzle 61, for example, instead of the configuration which uses the flat screw 40. Alternatively, the forming unit 110 may include a configuration which extrudes a filament-shaped thermoplastic resin material from the nozzle 61 while melting the resin material using heat to adhere the resin material to the forming table 210 instead of the configuration in which the forming material is discharged toward the forming table 210.

2-3. Third Other Embodiment

The discharge control mechanism 70 of the forming apparatus 100 may be configured by a shutter which moves to intersect the direction in which the forming material flows inside the flow path 65. The discharge control mechanism 70 may be configured by a plunger in which a piston protrudes into the flow path 65 to block the flow path 65. The discharge control mechanism 70 may be configured by combining two or more mechanisms from among the butterfly valve which is described in the embodiment, a shutter mechanism which uses a shutter, and a plunger.

2-4. Fourth Other Embodiment

In the forming apparatus 100, the cooling unit 75 may be realized using a configuration which cools the forming material which is discharged from the nozzle 61 using a method other than the cooling which uses the air blowing of the air blowing fan 77. For example, the cooling unit 75 may be realized by a refrigerant flow path which is embedded in the forming table 210. The cooling unit 75 may be omitted from the forming apparatus 100. In this case, the step of cooling the forming material is omitted from the forming process.

2-5. Fifth Other Embodiment

In the embodiment, the material supply unit 20 may include a configuration which includes a plurality of hoppers. In this case, a different material may be supplied from each hopper to the flat screw 40 and be mixed inside the groove portions 42 of the flat screw 40 to generate the forming material. For example, a powder material which serves as the main material which is described in the embodiment and solvents, binders, and the like which are added to the powder material may be supplied to the flat screw 40 from separate hoppers in parallel.

2-6. Sixth Other Embodiment

In the embodiment, a portion or all of the functions and processes which are realized using software may be realized using hardware. A portion or all of the functions and processes which are realized using hardware may be realized using software. It is possible to use various circuits such as integrated circuits, discrete circuits, or circuit modules which combine such circuits, for example, as the hardware.

3. Other Aspects

The invention is not limited to the embodiments and application examples which are described above and it is possible to realize the invention with various aspects in a scope that does not depart from the gist of the invention. For example, it is possible to realize the invention as the following aspects. Hereinafter, in order to solve a portion or all of the problems of the invention, or alternatively, in order to achieve a portion or all of the effects of the invention, it is possible to replace or combine, as appropriate, the technical features in the embodiments corresponding to technical features in the aspects which are described hereinafter. As long as a technical feature is not described as required in the specification, it is possible to remove the technical feature, as appropriate.

(1) The first aspect is provided as a manufacturing method of a three-dimensional formed object. The manufacturing method of the aspect includes a first discharging in which a forming material is continuously discharged from a nozzle while causing a position of the nozzle to change with respect to a forming table in a first direction which is perpendicular to a top surface of the forming table to cause the forming material to be deposited in the first direction, a second discharging in which the forming material is continuously discharged from the nozzle while changing the position of the nozzle with respect to the forming table in a second direction which is parallel to the top surface of the forming table to dispose the forming material along the second direction, and repeating the first discharging and the second discharging.

According to the manufacturing method of the aspect, it is possible to form a three-dimensional formed object which includes a part which is formed by the first discharging and has high strength in the first direction. Such a three-dimensional formed object has higher strength in the first direction than a three-dimensional formed object which is formed using only the second discharging.

(2) In the manufacturing method of the aspect, the repeating may include forming a part which is formed by the first discharging and a part which is formed by the second discharging such that the parts line up in the second direction.

According to the manufacturing method of the aspect, since the part which is formed by the first discharging is disposed to line up in the second direction with respect to the part which is formed by the second discharging, it is possible to increase the strength of the three-dimensional formed object in the first direction.

(3) In the manufacturing method of the aspect, the repeating may include forming a connecting portion, which straddles a plurality of material layers which are formed by the second discharging, using the first discharging.

According to the manufacturing method of the aspect, it is possible to form a three-dimensional formed object which has high strength in the stacking direction in which the material layers are stacked.

(4) In the manufacturing method of the aspect, the first discharging may include cooling the forming material which is discharged while discharging the forming material.

According to the manufacturing method of the aspect, since it is possible to deposit the forming material in the first direction while reducing the fluidity of the forming material which is discharged using the cooling, it is possible to suppress a reduction in the forming precision in the first discharging.

(5) In the manufacturing method of the aspect, the cooling may be performed using air blowing onto the forming material which is discharged.

According to the manufacturing method of the aspect, it is possible to easily perform the cooling of the forming material.

(6) In the manufacturing method of the aspect, the repeating may include, in at least one of between the first discharging and a following first discharging and between the second discharging and a following second discharging, temporarily stopping continuous discharging of the forming material from the nozzle, causing the nozzle to move with respect to the forming table, and subsequently restarting the continuous discharging of the forming material from the nozzle.

According to the manufacturing method of the aspect, it is possible to efficiently perform the forming of various shapes using the discharging of the forming material.

(7) In the manufacturing method, the forming material may be generated by melting at least a portion of a material which is supplied to a rotating flat screw.

According to the manufacturing method of the aspect, it is possible to miniaturize the structure which generates the forming material by using the flat screw. By using the flat screw, the precision of the discharge control of the forming material from the nozzle is increased and the forming of the formed object using the first discharging and the second discharging may be performed easily and efficiently.

(8) The second aspect is provided as a forming apparatus of a three-dimensional formed object. A forming apparatus of the aspect includes a discharging unit which includes a nozzle which discharges a forming material toward a forming table, a movement mechanism which modifies a position of the nozzle with respect to the forming table, and a control unit which executes a forming process which controls the discharging unit and the movement mechanism to dispose the forming material on the forming table to form the three-dimensional formed object. In the forming process, the control unit repeatedly executes a first discharge control in which the forming material is continuously discharged from the nozzle while causing the position of the nozzle to change with respect to the forming table in a first direction which is perpendicular to a top surface of the forming table to cause the forming material to be deposited in the first direction, and a second discharge control in which the forming material is continuously discharged from the nozzle while changing the position of the nozzle with respect to the forming table in a second direction which is parallel to the top surface of the forming table to dispose the forming material along the second direction.

According to the forming apparatus of the aspect, it is possible to form a three-dimensional formed object which includes a part which is formed by the first discharge control and has high strength in the first direction. Such a three-dimensional formed object has higher strength in the first direction than a three-dimensional formed object which only includes a part which is formed by the second discharge control.

(9) In the forming apparatus of the aspect, the discharging unit may include a forming material generating unit which includes a flat screw and which melts at least a portion of a material which is supplied to the flat screw which is rotating to generate the forming material.

According to the forming apparatus of the aspect, it is possible to miniaturize the discharging unit by using the flat screw. By using the flat screw, it is possible to increase the precision of the discharge control of the forming material from the nozzle and it is possible to easily and efficiently execute the forming process.

It is also possible to realize the invention in various aspects other than the manufacturing method or the forming apparatus of the three-dimensional formed object. For example, it is possible to realize the invention in aspects such as a three-dimensional formed object which is formed using such a manufacturing method or a forming apparatus, a forming method of the three-dimensional formed object, a discharging method or a depositing method of the forming material, and a method of controlling the discharging of the forming material. It is possible to realize the invention using a control method of the device, a computer program for realizing the method, a non-transitory storage medium on which the computer program is stored, or the like.

What is claimed is:

1. A manufacturing method of a three-dimensional formed object, the method comprising:
   a first discharging in which a forming material is continuously discharged from a nozzle while causing a position of the nozzle to change with respect to a forming table in a first direction which is perpendicular to a top surface of the forming table so as to form a continuously connected line-shaped layer along the first direction;
   a second discharging in which the forming material is continuously discharged from the nozzle while changing the position of the nozzle with respect to the forming table in a second direction which is parallel to the top surface of the forming table so as to form the continuously connected line-shaped layer along the second direction;
   repeating discharging processes of the first discharging and the second discharging; and
   stopping the forming material being discharged from the nozzle between a current discharging process of the first discharging and a subsequent discharging process of the first discharging by operating a butterfly valve located in a flow path through which the forming material flows.

2. The manufacturing method according to claim 1, wherein the repeating includes forming a part which is formed by the first discharging and a part which is formed by the second discharging such that the parts are arranged along the second direction.

3. The manufacturing method according to claim 1, wherein the repeating includes forming a connecting portion, which spans a plurality of the continuously connected line-shaped layers which are formed by the second discharging, using the first discharging.

4. The manufacturing method according to claim 1, wherein the first discharging includes cooling the forming material which is discharged while discharging the forming material.

5. The manufacturing method according to claim 4, wherein the cooling is performed using air blowing onto the forming material which is discharged.

6. The manufacturing method according to claim 1, further comprising:
   causing the nozzle to move with respect to the forming table after the current discharging process of the first discharging and the stopping of the forming material followed have done; and
   restarting the continuous discharging of the forming material from the nozzle as the subsequent discharging process of the first discharging after the causing of the nozzle to move with respect to the forming table.

7. The manufacturing method according to claim 1, wherein the forming material is generated by melting at least a portion of a source material which is supplied to a rotating flat screw.

* * * * *